United States Patent [19]

Shirai et al.

[11] Patent Number: 4,819,102

[45] Date of Patent: Apr. 4, 1989

[54] MAGNETIC TAPE TRANSFER PRINTING APPARATUS

[75] Inventors: Toshio Shirai, Kanagawa; Makoto Ando, Tokyo; Keisuke Unno, Tokyo; Toshiharu Kobayashi, Tokyo, all of Japan

[73] Assignee: Sony Corporation, Tokyo, Japan

[21] Appl. No.: 88,304

[22] Filed: Aug. 24, 1987

[51] Int. Cl.[4] .............................. G11B 5/86
[52] U.S. Cl. ........................... 360/17; 360/16
[58] Field of Search ............... 360/17, 16, 128, 15; 369/84

[56] References Cited

U.S. PATENT DOCUMENTS

| | | | |
|---|---|---|---|
| 2,890,288 | 6/1959 | Newman | 360/17 |
| 3,277,244 | 7/1962 | Frost | 360/17 |
| 3,752,926 | 8/1973 | Smaller | 360/17 |
| 4,110,797 | 8/1978 | Hoshino et al. | 360/17 |
| 4,644,416 | 2/1987 | Yomada | 360/17 |

Primary Examiner—Alan Faber
Assistant Examiner—Kevin J. Fournier
Attorney, Agent, or Firm—Ronald P. Kananen

[57] ABSTRACT

A magnetic tape transfer printing apparatus including a drum mounted for rotation. A master magnetic tape having information recorded thereon is held in contact with a slave magnetic tape on a portion of the circumferential surface of the drum. A magnetic transfer bias field is applied to transfer the information from the master magnetic tape onto the slave magnetic tape. The drum contains a high-permeability magnetic material at least in the circumferential surface. This is effective to decrease the lateral component of the bias magnetic field and increase the vertical component of the bias magnetic field, thereby minimizing the degree of demagnetization of the master magnetic tape during the transfer printing process.

16 Claims, 7 Drawing Sheets

MAGNETIC TAPE TRANSFER PRINTING APPARATUS

BACKGROUND OF THE INVENTION

This invention relates to a magnetic tape transfer printing apparatus for transferring information between two magnetic tapes held in contact with each other.

Magnetic tape transfer printing apparatus have been proposed, for example, in Japanese Patent Publication No. 52-36004. The transfer printing apparatus employs a transfer printing drum, and a magnetic head for applying a magnetic transfer bias field to transfer information between master and slave magnetic tapes held in contact with each other on a portion of the circumference of the transfer printing drum.

One serious problem associated with the conventional magnetic tape transfer printing apparatus is that the master tape is demagnetized to a considerable extent during the transfer printing process. This is true particularly when information is transferred from a metal master tape onto a barium-ferrite slave tape.

SUMMARY OF THE INVENTION

Therefore, it is a main object of the invention to provide an improved magnetic tape transfer printing apparatus which can minimize the degree of demagnetization of a master magnetic tape in a transfer printing process where information is transferred from the master magnetic tape onto a slave magnetic tape in the presence of a bias magnetic field.

There is provided, in accordance with the invention, a magnetic tape transfer printing apparatus including a drum mounted for rotation in the transfer printing apparatus, the drum having a circumferential surface. The transfer printing apparatus also includes means for holding a master magnetic tape having information recorded thereon in contact with a slave magnetic tape on a portion of the drum circumferential surface, means for generating a magnetic transfer bias field to transfer the information from the master magnetic tape onto the slave magnetic tape, and means for rotating the drum to transport the superimposed master and slave magnetic tapes in unison. The drum contains a high-permeability magnetic material at least in the circumferential surface. This is effective to decrease a lateral component of the bias magnetic field and increase a vertical component of the bias magnetic field, thereby minimizing the degree of demagnetization of the master magnetic tape during the transfer printing process.

BRIEF DESCRIPTION OF THE DRAWINGS

This invention will be described in greater detail by reference to the following description taken in connection with the accompanying drawings in which.

DETAILED DESCRIPTION OF THE PREFERRED EMBODIMENT

Figure 1:
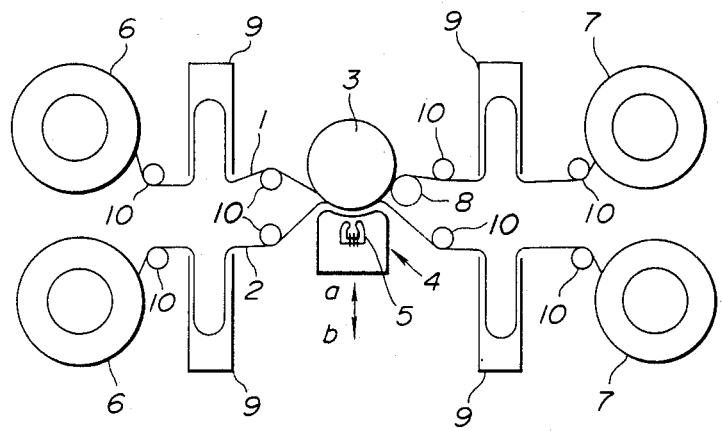
FIG. 1 is a schematic diagram showing a prior art magnetic tape transfer printing apparatus.

Prior to the description of the preferred embodiment of the present invention, the prior art magnetic tape transfer printing apparatus of FIG. 1 is briefly described in order to provide a basis for a better understanding of the difficulties attendant therewith.

Referring to FIG. 1, master and slave tapes 1 and 2 are spooled between respective pairs of first and second spools 6 and 7. The master and slave tapes 1 and 2 have a magnetic layer formed on an appropriate tape base. Typical examples include a metal tape having a magnetic layer formed by coating metal powder, a barium-ferrite tape having a magnetic layer formed by coating barium-ferrite powder, and a cobalt-gamma tape having a magnetic layer formed by coating cobalt and iron oxide powder. Guide rollers 10 are provided to guide the master and slave tapes 1 and 2 so that they extend through a transfer printing section between a cylindrical transfer printing drum 3 and a pressure box 4. It is to be noted that the master and slave tapes 1 and 2 are directed to have their magnetic layers facing toward each other in the transfer printing section. The pressure box 4 has a front surface shaped in conformity with a portion of the circumference of the transfer printing drum 3. The pressure box 4 is mounted for movement in directions toward and away from the transfer printing drum 3. The pressure box 4 moves toward the transfer printing drum 3 to apply on air flow to its front surface to press the master and slave tapes 1 and 2 against the transfer printing drum 3 so that the master and slave tapes 1 and 2 are in pressure contact with each other with their magnetic layers facing toward each other. The transfer printing drum 3 drives the master and slave tapes 1 and 2 at a high speed with the aid of a pinch roller 8. The pressure box 4 houses a magnetic head 5 which produces a lateral bias magnetic field to transfer information from the master tape 1 onto the slave tape 2. The numeral 9 designates air chambers provided on the upstream and downstream sides of the transfer printing drum 3 for the master and slave tapes 1 and 2 for adjusting the tension on the master and slave tapes 1 and 2.

One problem inherent with such a conventional magnetic tape transfer printing apparatus is that the master tape is demagnetized to a considerable degree when information is transferred from a metal master tape onto a barium-ferrite slave tape. This degree of demagnetization of the master tape is much greater than when information is transferred from a metal master tape onto a cobalt-gamma slave tape. The reason for this is that the bias magnetic field required to maximize the transfer output is much greater for a barium-ferrite slave tape than for a cobalt-gamma slave tape and the application of such a greater bias magnetic field prompts the tendency for demagnetization of the master tape.

The reason why barium-ferrite tapes require a greater bias magnetic field than cobalt-gamma tapes is not fully understood, but some general observations may be made. For barium-ferrite tapes having a greater amount of vertical magnetizing component than cobalt-gamma tapes, the vertical component of the bias magnetic field performs a dominant role during the transfer printing process and a great amount of current is required to be supplied to the ring type head in order to obtain a sufficient vertical magnetic field. In addition, the degree of demagnetization of the master tape is mainly affected by the lateral component of the bias magnetic field and is relatively unaffected by the vertical component of the bias magnetic field.

According to the invention, the degree of demagnetization of the master tape is minimized by decreasing the lateral component of a bias magnetic field acting on the master tape while increasing the vertical component of the bias magnetic field.

Figure 2:
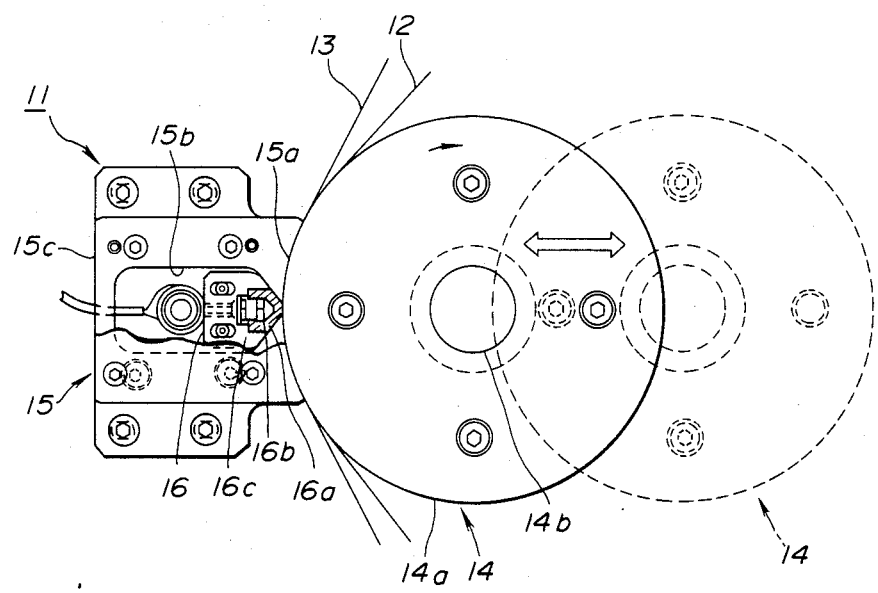
FIG. 2 is a fragmentary plan view showing a significant portion of a magnetic tape transfer printing apparatus made in accordance with the invention.
Figure 3:
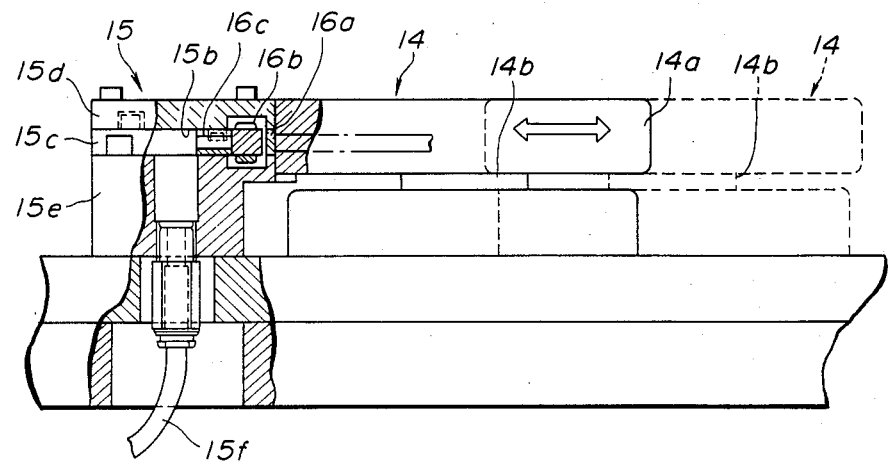
FIG. 3 is a fragmentary elevational view, partly in section of the magnetic tape transfer printing apparatus of FIG. 2.
Figure 4:
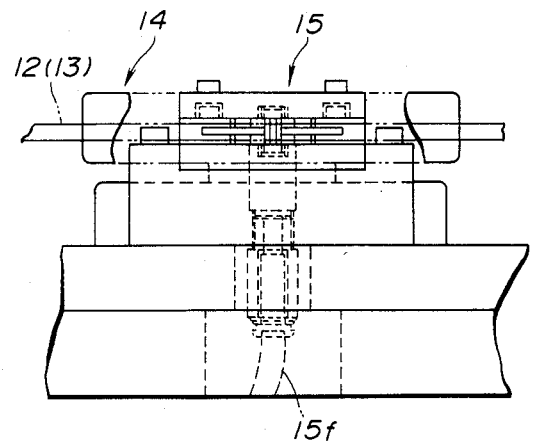
FIG. 4 is a fragmentary side view of the magnetic tape transfer printing apparatus of FIG. 2.

Referring to FIGS. 2 to 4, there is illustrated one embodiment of a magnetic tape transfer printing apparatus in accordance with the invention. The transfer printing apparatus, generally designated by the numeral 11, includes a cylindrical transfer printing drum 14 and a pressure box 15 fixed at a position with respect to the transfer printing drum 14.

The transfer printing drum 14 is made of soft magnetic iron and its surface is plated with nickel or chrome to form a thin nickel or chrome layer for hardening purposes thereon so that the transfer printing drum 14 has a high permeability. An air actuator (not shown) is drivingly connected to move the transfer printing drum 14 in directions toward and away from the pressure box 14. The transfer printing drum 14 has a shaft drivingly connected to a motor (not shown) which rotates to rotate the transfer printing drum 14 at a constant speed.

The pressure box 15 has a front surface 15a shaped in conformity with a portion of the circumference of the transfer printing drum 14. The pressure box 15 includes a head housing 15c having a head cap 15d mounted on the upper surface thereof and a base 15e mounted on the lower surface thereof. The head housing 15c has an air chamber 15b connected to an air compressor (not shown) through an air hose 15f extending through the base 15e. The air chamber 15b opens to the atmosphere through an outlet port formed centrally in the curved front surface 15a to eject compressed air to ensure the pressure contact of the magnetic layers of the master and slave tapes 12 and 13.

The head housing 15c houses a magnetic head 16 for applying a bias magnetic field to the master and slave tapes 12 and 13 travelling in synchronism with each other on the circumference 14a of the transfer printing drum 14. The magnetic head 16 has a bias head 16a mounted on a head holder 16c. The bias head 16a is provided at its tip end with a magnetic gap. The bias head 16a has a coil 16b wound around thereon. The head holder 16c is held between the head housing cap 15d and the head housing 15e so that the magnetic head 16 is mounted in the head housing 15c.

The operation is as follows: When the transfer printing drum 14 is at a position away from the pressure box 15, the master and slave tapes 12 and 13 are journalled on respective tape guides (not shown) with their magnetic layers facing toward each other. The air actuator is driven to move the transfer printing drum 14 toward the pressure box 15 so as to bring the master and slave tapes 12 and 13 into contact with each other on a portion of the circumference of the transfer printing drum 14. Compressed air is ejected from the air chamber 15b toward the master and slave tapes 12 and 13 to ensure the pressure contact of the master and slave tapes 12 and 13. Following this, the magnetic head coil 16b is connected to a bias signal source (not shown) to produce a bias magnetic field so as to transfer information from the master tape 12 onto the slave tape 13 while rotating the transfer printing drum 14 to feed the master and slave tapes 12 and 13 in unison.

The transfer printing drum 14 of the magnetic tape transfer printing apparatus of the invention is made of a high-permeability magnetic material such for example, as soft magnetic iron. As a result, the extent to which the bias magnetic field is drawn toward the transfer printing drum 14 during the transfer printing process is increased. This increases the vertical component of the bias magnetic field acting on the master and slave tapes 12 and 13 and decreases the lateral component of the bias magnetic field.

When information is transferred from a metal master tape onto a barium-ferrite slave tape with the magnetic tape transfer printing apparatus of the invention, the increased vertical component of the bias magnetic field has an advantageous effect on the vertical magnetizing component of the barium-ferrite slave tape 13 to improve the transfer output to the slave tape 13, as compared to the conventional magnetic tape transfer printing apparatus.

In order to illustrate the effects obtainable by the various features of the invention, reference is made to FIGS. 5 to 11.

Figure 5:
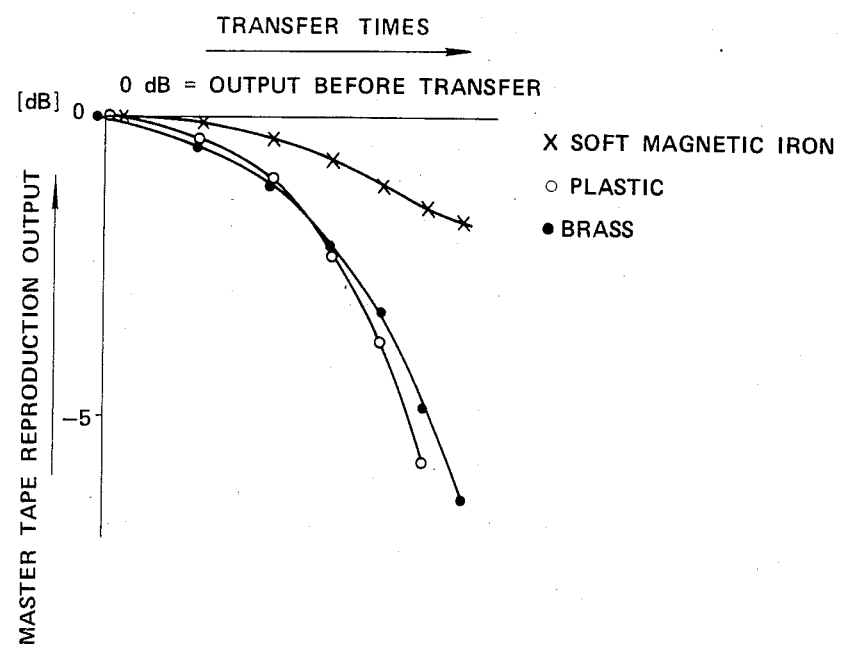
FIG. 5 is a graph showing comparative master tape demagnetization characteristics for three different materials of the transfer printing drum.

Referring to FIG. 5, the demagnetization characteristic is compared for different materials of the transfer printing drum by plotting the master tape reproduction output during transfer printing processes where information is transferred from a metal master tape onto a barium-ferrite slave tape. Curve A relates to a transfer printing drum made of soft magnetic iron in accordance with the invention, curve B relates to a transfer printing drum made of plastic, and curve C relates to a transfer printing drum made of brass. As can be seen from FIG. 5, the degree of demagnetization of the master tape is fairly less with the transfer printing drum made of soft magnetic iron than obtained with the transfer printing drum made of plastic or brass.

Figure 6:
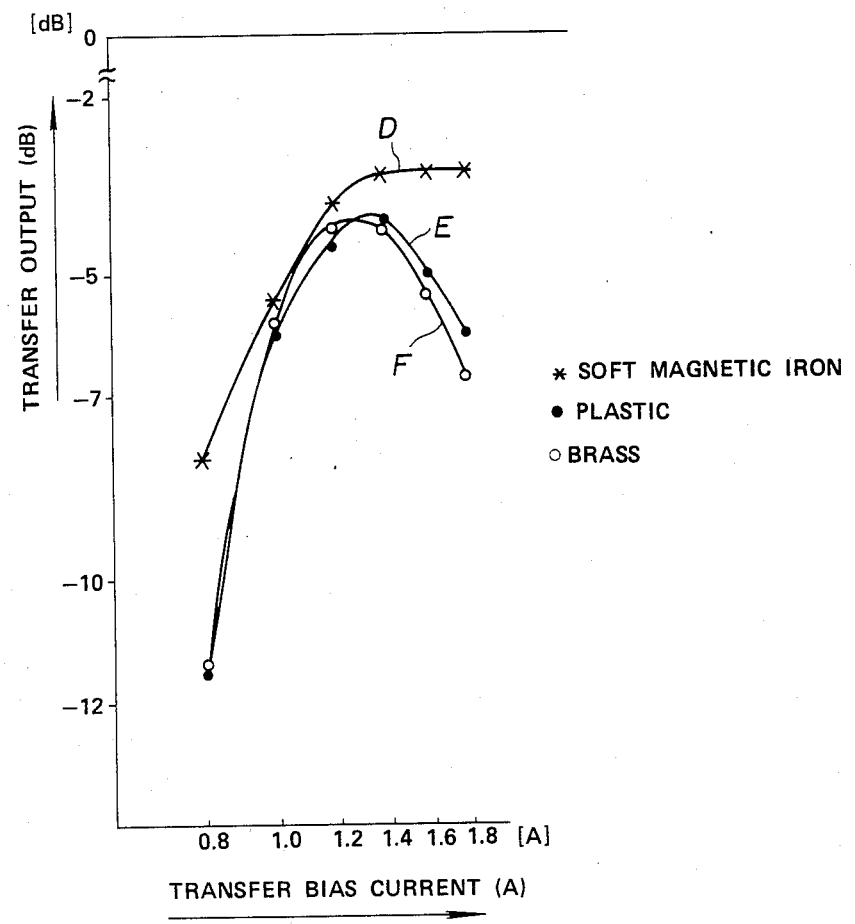
FIG. 6 is a graph showing comparative transfer characteristics for three different materials of the transfer printing drum when information is transferred from a metal master tape onto a barium-ferrite slave tape.

Referring to FIG. 6, the transfer characteristic is compared for different materials of the transfer printing drum by plotting the transfer bias current against the transfer output during transfer printing processes where information is transferred from a metal master tape onto a barium-ferrite slave tape. Curve D relates to a transfer printing drum made of soft magnetic iron in accordance with the invention, curve E relates to a transfer printing drum made of plastic, and curve F relates to a transfer printing drum made of brass. It is apparent from FIG. 6 that the transfer output is fairly greater with the transfer printing drum made of soft magnetic iron than obtained with the transfer printing drum made of plastic or brass over the full range of the transfer bias current.

Figure 7:
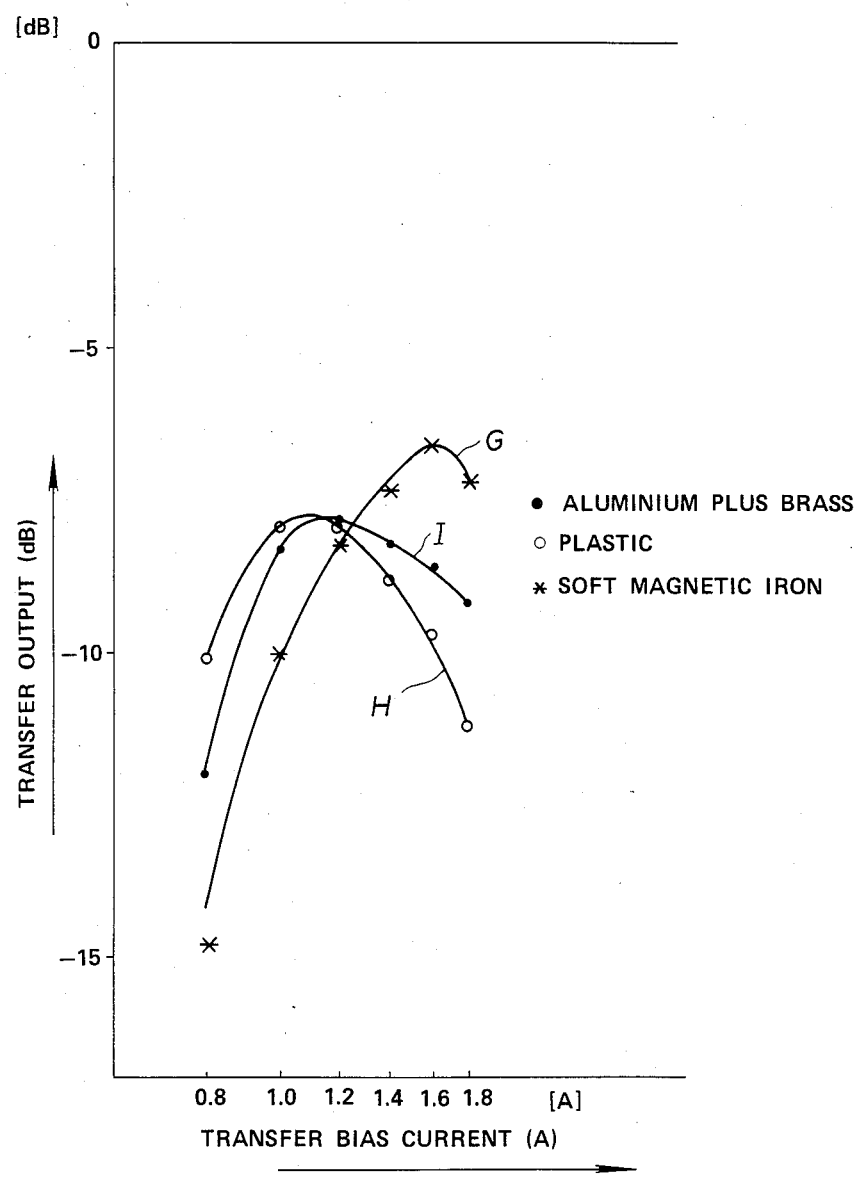
FIG. 7 is a graph showing comparative transfer characteristics for three different materials of the transfer printing drum when information is transferred from a metal master tape onto a cobalt-gamma slave tape.

Referring to FIG. 7, the transfer characteristic is compared for different materials of the transfer printing drum by plotting the transfer bias current against the transfer output during transfer printing processes where information is transferred from a metal master tape onto a cobalt-gamma slave tape. Curve G relates to a transfer printing drum made of soft magnetic iron in accordance with the invention, curve H relates to a transfer printing drum made of plastic, and curve I relates to a transfer printing drum made of aluminum plus brass. As can be seen from FIG. 7, the transfer output is fairly greater with the transfer printing drum made of soft magnetic iron than obtained with the transfer printing drum made of plastic or aluminum plus brass.

Figure 8:
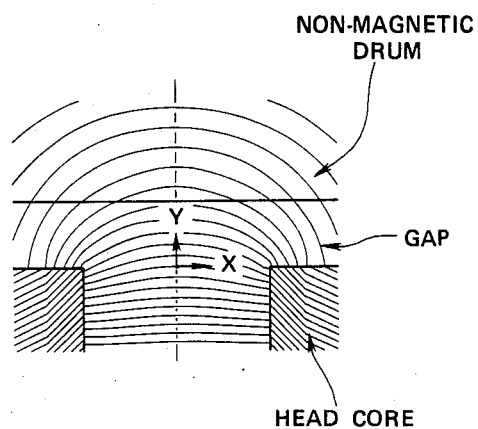
FIG. 8 is a diagram showing a bias magnetic field pattern produced in the transfer printing section employing a non-magnetic transfer printing drum.
Figure 9:
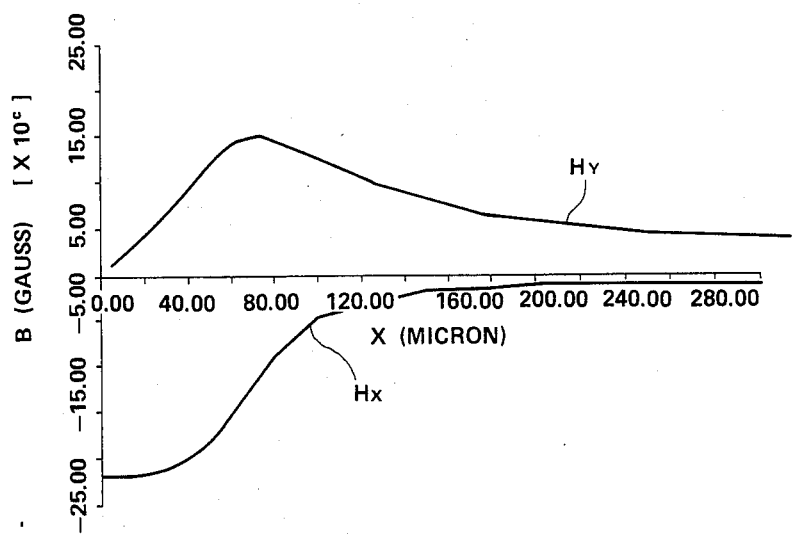
FIG. 9 is a graph showing the intensities of the vertical and lateral components of the bias magnetic field pattern of FIG. 8.
Figure 10:
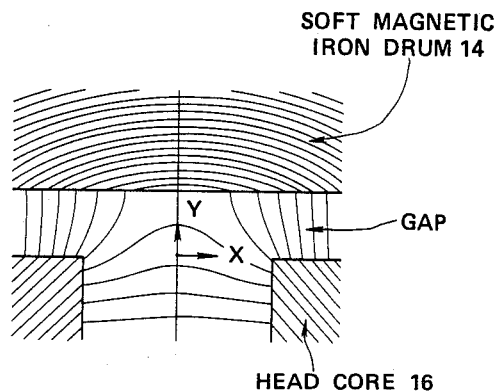
FIG. 10 is a diagram showing a bias magnetic field pattern produced in the transfer printing section employing a soft magnetic iron transfer printing drum.
Figure 11:
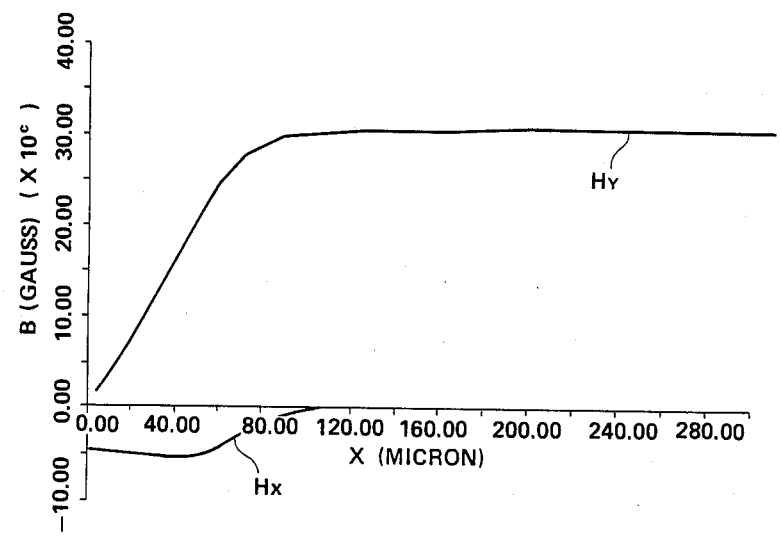
FIG. 11 is a graph showing the intensities of the vertical and lateral components of the bias magnetic field pattern of FIG. 10.

FIG. 8 shows bias magnetic field lines produced in the transfer printing section including a non-magnetic transfer printing drum. In this case, the bias magnetic field lateral component Hx is relatively great and the bias magnetic field vertical component Hy is relatively small, as shown in FIG. 9. FIG. 10 shows bias magnetic field lines produced in the transfer printing section including a soft magnetic iron drum. In this case, the lateral component Hx of the bias magnetic field is relatively small and the vertical component Hy of the bias magnetic field is relatively great, as shown in FIG. 11. It is apparent from a comparison of the graphs of FIGS. 9 and 11 that the use of a transfer printing drum made of soft magnetic iron is effective to decrease the lateral component Hx of the bias magnetic field to a considerable extent and increase the vertical component Hy of the bias magnetic field to a considerable extent.

Although the transfer printing drum 14 has been described as made of soft magnetic iron, there is no intention to be limited to such a material. The transfer printing drum 14 may be made of any high-permeability magnetic material at least in the circumferential surface of the transfer printing drum 14. Such high-permeability magnetic materials include, but are in no way limited to, soft magnetic ferrite, amorphous soft magnetic alloy, sendust alloy (Fe-Si-Al alloy), and the like.

While the invention has been described in conjunction with a specific embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. A magnetic tape transfer printing apparatus comprising:
   a drum mounted for rotation in said transfer printing apparatus, said drum having a circumferential surface;
   means for holding a master magnetic tape having information recorded therein in direct contact with a slave magnetic tape on a portion of said drum circumferential surface;
   means for generating a magnetic transfer bias field to transfer the information from said master magnetic tape onto said slave magnetic tape at said portion of said drum circumferential surface;
   means for rotating said drum to transport said master and slave magnetic tape in unison; and
   said drum being made of a high-permeability magnetic material at least for said circumferential surface;
   where the magnetic transfer bias field acting on said master magnetic tape to transfer the information from said master magnetic tape onto said slave magnetic tape has an increased vertical component and a decreased lateral component.

2. The apparatus as claimed in claim 1, wherein said master magnetic tape is a metal tape having a magnetic layer containing metal magnetic powder.

3. The apparatus as claimed in claim 2, wherein said slave magnetic tape is a barium-ferrite tape having a magnetic layer containing barium-ferrite magnetic powder.

4. The apparatus as claimed in claim 2 wherein said slave magnetic tape is a cobalt-gamma tape having a magnetic layer containing magnetic iron oxide magnetic powder.

5. The apparatus as claimed in claim 1, wherein said high-permeability magnetic material is soft magnetic iron.

6. The apparatus as claimed in claim 1, wherein said high-permeability magnetic material is Fe-Si-Al alloy.

7. The apparatus as claimed in claim 1, wherein said high-permeability magnetic material is soft magnetic ferrite.

8. The apparatus as claimed in claim 1, wherein said high-permeability magnetic material is amorphous soft magnetic alloy.

9. The apparatus as claimed in claim 1, wherein said means for holding a master magnetic tape in contact with a slave magnetic tape includes a pressure surface shaped in conformity with a portion of said drum circumferential surface.

10. The apparatus as claimed in claim 9, wherein said drum is mounted in said transfer printing apparatus for movement toward and away from said pressure surface.

11. The apparatus as claimed in claim 10, which includes means for moving said drum toward said pressure surface to push said master and slave magnetic tapes against said pressure surface.

12. A magnetic tape transfer printing apparatus comprising:
    a drum mounted for rotation in said transfer printing apparatus, said drum having a circumferential surface;
    means for holding a master magnetic tape having information recorded thereon in direct contact with a slave magnetic tape on a portion of said drum circumferential surface;
    means for generating a magnetic transfer bias field to transfer the information from said master magnetic tape onto said slave magnetic tape at said portion of said drum circumferential surface;
    means for rotating said drum to transport said master and slave magnetic tapes in unison; and
    means for minimizing the demagnetization of the master tape by decreasing the lateral component of a bias magnetic field acting on the master tape while increasing the vertical component of the bias magnetic field acting on the master tape, said demagnetization minimizing means including said drum being made from a high-permeability material at least for said circumferential surface.

13. The magnetic tape transfer printing apparatus of claim 12 wherein said high-permeability material of said drum is soft magnetic iron.

14. The magnetic tape transfer printing apparatus of claim 12 wherein said high-permeability material of said drum is Fe-Si-Al alloy.

15. The magnetic tape transfer printing apparatus of claim 12 wherein said high-permeability material of said drum is soft magnetic ferrite.

16. The magnetic tape transfer printing apparatus of claim 12 wherein said high-permeability material of said drum is amorphous soft magnetic alloy.

* * * * *